US012506284B2

(12) United States Patent
Lee et al.

(10) Patent No.: US 12,506,284 B2
(45) Date of Patent: Dec. 23, 2025

(54) WATERPROOF ELECTRICAL CONNECTOR

(71) Applicants: Kia Corporation, Seoul (KR); Hyundai Motor Company, Seoul (KR); KUM LLC, Ulsan (KR)

(72) Inventors: Sam Gyun Lee, Seoul (KR); Dong Hoon Lee, Ulsan (KR); Seung Myeon Bae, Hwaseong-si (KR); Young Il Park, Ulsan (KR); Sang Ho Bae, Ulsan (KR); Young Joo Yun, Ulsan (KR)

(73) Assignees: Hyundai Motor Company, Seoul (KR); Kia Corporation, Seoul (KR); KUM LLC, Ulsan (KR)

( * ) Notice: Subject to any disclaimer, the term of this patent is extended or adjusted under 35 U.S.C. 154(b) by 466 days.

(21) Appl. No.: 18/073,513

(22) Filed: Dec. 1, 2022

(65) Prior Publication Data

US 2023/0238718 A1 Jul. 27, 2023

(30) Foreign Application Priority Data

Jan. 24, 2022 (KR) ........................ 10-2022-0009648

(51) Int. Cl.
*H01R 4/30* (2006.01)
*H01R 13/52* (2006.01)

(52) U.S. Cl.
CPC ........... *H01R 4/30* (2013.01); *H01R 13/5202* (2013.01); *H01R 2201/26* (2013.01)

(58) Field of Classification Search
CPC ... H01R 4/30; H01R 13/5202; H01R 2201/26
See application file for complete search history.

(56) References Cited

U.S. PATENT DOCUMENTS 5,433,628 A * 7/1995 Sadaishi ............ H01R 13/5202 439/736
7,234,454 B2 * 6/2007 Tauchi .................. H01F 41/005 336/107
9,039,435 B2 * 5/2015 Horiuchi ................ H01R 11/12 439/287
9,083,094 B2 * 7/2015 Teramoto ................. H01R 4/64
9,211,852 B2 * 12/2015 Omori ...................... B60R 16/02
9,362,665 B2 * 6/2016 Omori .................. H01R 31/085
9,419,349 B2 * 8/2016 Marson ................ H01R 9/0521
9,716,363 B2 * 7/2017 Saitoh .................... H01R 43/24
9,871,309 B2 * 1/2018 Gao ....................... H01R 4/302
10,205,253 B2 * 2/2019 Kitagawa ............... H01R 11/12
11,664,620 B2 * 5/2023 Ripper ................. H01R 13/639 439/352
11,670,877 B2 * 6/2023 Bajic ...................... H01R 11/09 174/126.1

* cited by examiner

*Primary Examiner* — Thanh Tam T Le
(74) *Attorney, Agent, or Firm* — Slater Matsil, LLP

(57) ABSTRACT

In an embodiment an electrical connector includes an earth terminal including a wire terminal contact part and a ground fixing part integrally formed with the wire terminal contact part and a connector housing including a housing body in which the wire terminal contact part is placeable and a terminal cover part located at an outer side of the housing body and configured to surround the ground fixing part.

19 Claims, 5 Drawing Sheets

WATERPROOF ELECTRICAL CONNECTOR

CROSS-REFERENCE TO RELATED APPLICATIONS

This application claims the benefit of Korean Application No. 10-2022-0009648, filed on Jan. 24, 2022, which application is hereby incorporated herein by reference.

TECHNICAL FIELD

The present disclosure relates to an electrical connector, and specifically, to an electrical connector for preventing corrosion of an earth terminal exposed to the outside of a connector housing and increasing waterproof performance.

BACKGROUND

In general, an electrical connector is used for the purpose of grounding an electric device, and a terminal of a wire connected to the electric device is configured to be connected to an earth terminal.

A conventional electrical connector includes a plurality of wires connected to an electric device, an earth terminal electrically connected to terminals of the wires, and a connector housing to which the wires and the earth terminal are assembled.

In order to prevent moisture from flowing into a connection part between the wires and the earth terminal, the electrical connector performs a sealing process of assembling the earth terminal into an insertion hole of the connector housing and then sealing the insertion hole with a sealing material.

In this case, only a part of the earth terminal connected to the terminals of the wires is inserted into the connector housing, and a part fastened to a vehicle body panel, i.e., an earth bolting part, is disposed to protrude to the outside of the connector housing.

However, since the earth bolting part is fastened to the vehicle body panel through a bolt member in a state in which it protrudes to the outside of the connector housing, corrosion is likely to occur, thereby degrading the performance and aesthetics of the electrical connector.

The above information disclosed in this Background section is only for enhancement of understanding of the background of the disclosure and accordingly it may include information that does not form the prior art that is already known in this country to a person of ordinary skill in the art.

SUMMARY

Embodiments solve the above problem and provide an electrical connector, which may minimize an exposed portion of an earth terminal exposed to the outside of a connector housing thereby preventing corrosion of the earth terminal and increasing waterproof performance.

Embodiments provided an electrical connector including: an earth terminal including a wire terminal contact part and a ground fixing part integrally formed with the wire terminal contact part; and a connector housing including a housing body in which the wire terminal contact part is accommodated and disposed and a terminal cover part integrally formed on an outer side of the housing body and configured to surround the ground fixing part.

According to an embodiment, the ground fixing part is provided with an earth bolting part fastened to a vehicle grounding part in the center thereof, and the terminal cover part is formed to surround the ground fixing part except for the earth bolting part.

In addition, an upper sealing part and a lower sealing part configured to prevent moisture from entering between the terminal cover part and the ground fixing part are provided on a radially outer side of the earth bolting part.

In addition, the upper sealing part is formed in a closed loop shape surrounding the earth bolting part on an upper surface of the ground fixing part, and the lower sealing part is formed in the closed loop shape surrounding the earth bolting part on a lower surface of the ground fixing part.

In addition, the terminal cover part is provided with an upper sealing hole into which the upper sealing part is inserted and a lower sealing hole into which the lower sealing part is inserted, and the upper sealing hole and the lower sealing hole are spaced radially from the earth bolting part.

In addition, a first plating layer is formed on a surface of the wire terminal contact part, a second plating layer is formed on a surface of the ground fixing part, and the second plating layer is formed to be thicker than the first plating layer.

In addition, the terminal cover part is disposed on the second plating layer.

In addition, a through hole is provided in the center of the earth bolting part, and the second plating layer is formed to extend to an inner circumferential surface of the earth bolting part surrounding the through hole.

In addition, the ground fixing part is provided with a stopper part extending in a curved shape on an edge thereof, and the terminal cover part is configured to surround the stopper part together with the ground fixing part.

Through the above configuration, the electrical connector according to the present disclosure provides the following effects.

First, it is possible to minimize an exposed portion of an earth terminal exposed to the outside of a connector housing by integrally molding the connector housing to the earth terminal, thereby preventing corrosion of the earth terminal and increasing waterproof performance.

Second, since the connector housing is integrally molded to the earth terminal, a press-fitting process of press-fitting a wire terminal contact part of the earth terminal into the connector housing is unnecessary, and connector productivity increases because the press-fitting process is omitted.

Third, since the connector housing is integrally formed to the earth terminal, the amount of sealing material used for waterproofing and a sealing part of the electrical connector is reduced, thereby reducing the cost. In addition, the waterproof performance is improved as a sealing range for realizing a waterproof function is reduced compared to the prior art.

Fourth, since the wire terminal contact part and a ground fixing part of the earth terminal are plated with different thicknesses, the wire terminal contact part maintains optimum connection performance, and at the same time, it is possible to prevent corrosion of the ground fixing part as much as possible.

Fifth, since a stopper part of the earth terminal is also provided with a terminal cover part, it is possible to prevent the stopper part from flowing in a state of being assembled to a vehicle grounding part or from being separated from the vehicle grounding part. Since the flow of the stopper part is improved without using a separate part for preventing the flow and separation of the stopper part, it is possible to reduce a cost and improve aesthetics.

The effects of the present disclosure are not limited to the above-mentioned effects, and other effects of the present disclosure not mentioned will be clearly understood by those skilled in the art to which the present disclosure pertains from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
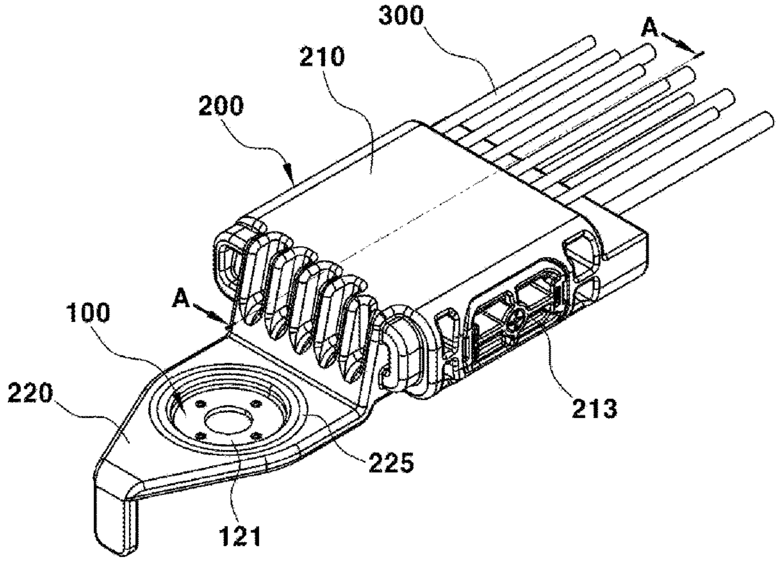
FIG. 1 is a perspective view illustrating an electrical connector according to an embodiment of the present disclosure.

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION OF ILLUSTRATIVE EMBODIMENTS

Specific structural or functional descriptions presented in the embodiments of the present disclosure are only exemplified for the purpose of describing the embodiments according to the concept of the present disclosure, and the embodiments according to the concept of the present disclosure may be carried out in various forms.

In addition, throughout this specification, when a portion "includes" a certain component, it means that other components may be further included, other than excluding other components, unless specially stated otherwise.

In addition, in this specification, the classification of the names of the components into "first", "second", etc. is only to distinguish the components having the same name, and does not limit the functions or orders of the components.

Hereinafter, embodiments of the present disclosure will be described with reference to the accompanying drawings. Matters expressed in the accompanying drawings may be different from the forms actually implemented as the schematic drawings for easy explanation of the embodiments of the present disclosure.

Figure 2:
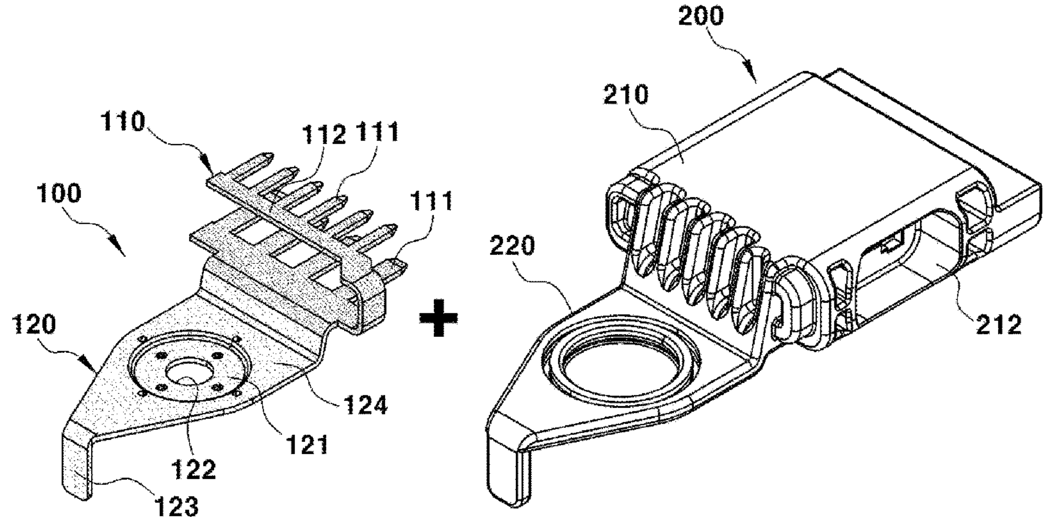
FIG. 2 is a schematic view for explaining a method of molding a connector housing of an electrical connector according to an embodiment of the present disclosure.
Figure 3:
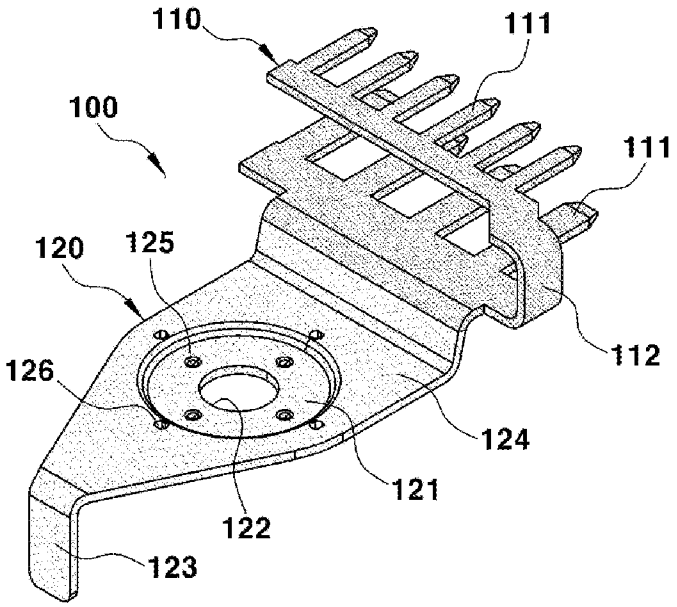
FIG. 3 is a perspective view illustrating an earth terminal of an electrical connector according to an embodiment of the present disclosure.
Figure 4:
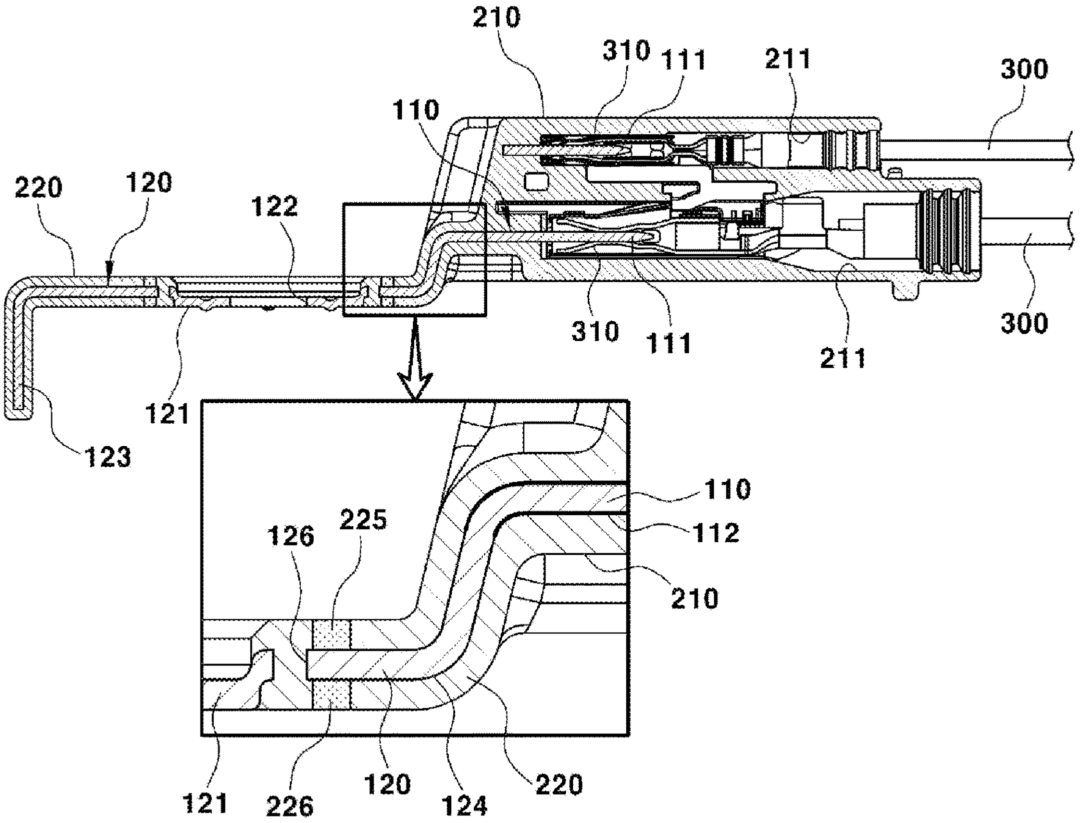
FIG. 4 is a view illustrating the electrical connector viewed from A-A in FIG. 1.
Figure 5:
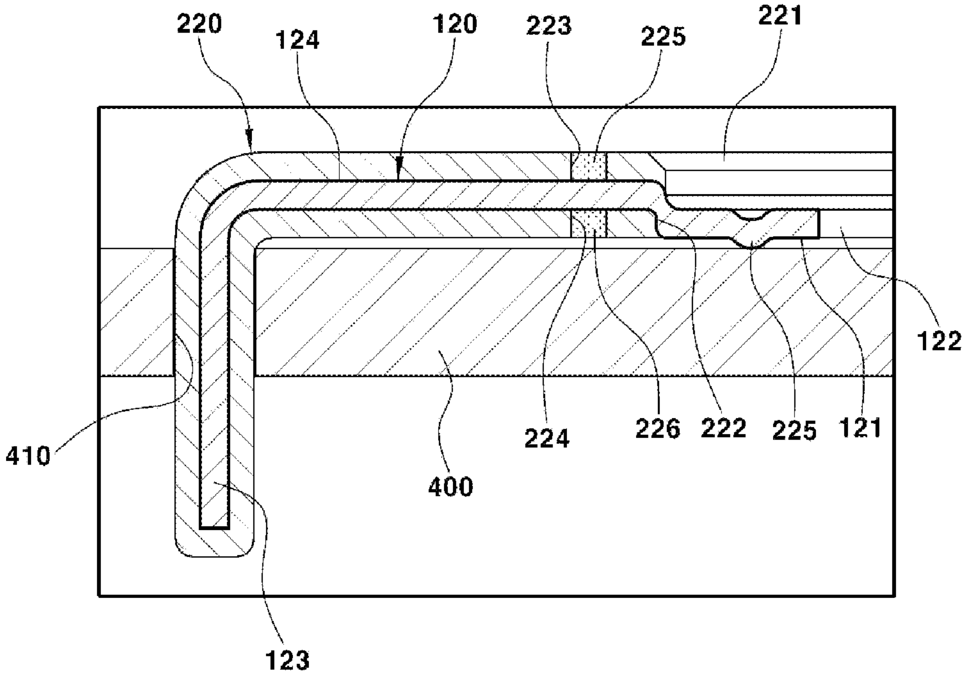
FIG. 5 is a view illustrating a state in which a stopper part of an electrical connector according to an embodiment of the present disclosure is assembled to a vehicle body panel.
Figure 6:
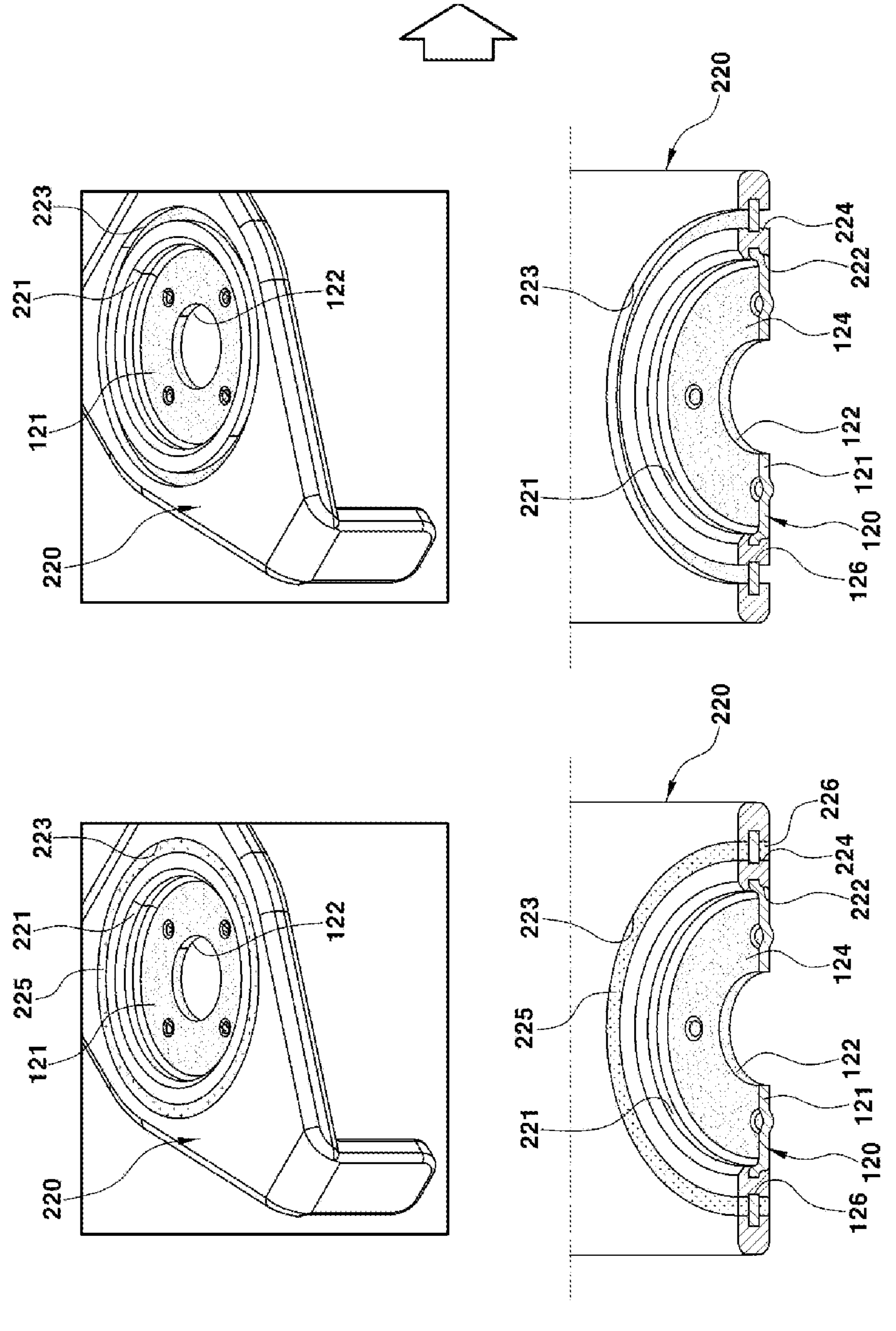
FIG. 6 is a view illustrating a process of molding a sealing part of an electrical connector according to an embodiment of the present disclosure.

FIG. 1 is a perspective view illustrating an electrical connector according to an embodiment of the present disclosure, FIG. 2 is a schematic view for explaining a method of molding a connector housing of the electrical connector according to an embodiment of the present disclosure, FIG. 3 is a perspective view illustrating an earth terminal of the electrical connector according to an embodiment of the present disclosure, FIG. 4 is a view illustrating the electrical connector viewed from A-A in FIG. 1, FIG. 5 is a view illustrating a state in which a stopper part of the electrical connector is assembled to a vehicle body panel according to an embodiment of the present disclosure, and FIG. 6 is a view illustrating a process of molding a sealing part of the electrical connector according to an embodiment of the present disclosure.

As illustrated in FIGS. 1 and 2, the electrical connector according to an embodiment of the present disclosure may be configured to include an earth terminal 100, a connector housing 200, and a plurality of wires 300 assembled to the connector housing 200.

As illustrated in FIG. 3, the earth terminal 100 is configured to include a wire terminal contact part 110 and a ground fixing part 120 integrally formed with the wire terminal contact part 110.

The wire terminal contact part 110 is configured to be connected to terminals, i.e., wire terminals, 310 provided at the ends of the wires 300. The wire terminal contact part 110 is configured to be simultaneously connected to a plurality of wire terminals 310.

The wire terminal contact part 110 is electrically connected by being in contact with the wire terminals 310 in the connector housing 200, and a plurality of contact pins 111 individually contacting the wire terminals 310 are provided.

The wire terminal contact part 110 may be connected to a plurality of electric devices through wires 300. For example, the wires 300 may be connected to a plurality of electric devices provided in a vehicle. The earth terminal 100 having the wire terminal contact part 110 may be referred to as a multi-earth terminal.

The ground fixing part 120 is configured to be mounted on a vehicle grounding part for grounding the earth terminal 100. Specifically, the ground fixing part 120 is provided with an earth bolting part 121 fastened to the vehicle grounding part. For example, the vehicle grounding part may be a vehicle body panel.

The earth bolting part 121 is provided in a central portion of the ground fixing part 120, and is fastened to and fixed to the vehicle body panel through a fastening member. The earth bolting part 121 is fastened to the vehicle body panel while it is in contact with the vehicle body panel. To this end, the earth bolting part 121 is formed to be stepped downward in the central portion of the ground fixing part 120, and is provided with a plurality of contact points 125.

In an embodiment of the present disclosure, the earth bolting part 121 is formed in a disk shape, and a bolt member or the like is used as the fastening member.

In addition, the ground fixing part 120 is provided with a plurality of holes 126 in which an injected resin is filled during injection molding of the connector housing 200. The holes 126 are formed to pass through the ground fixing part 120 in a thickness direction, and is spaced apart from the earth bolting part 121 in a circumferential direction.

As illustrated in FIGS. 1 and 4, the connector housing 200 is configured to include a housing body 210 and a terminal cover part 220.

The housing body 210 has an internal space in which the wire terminal contact part 110 is accommodated and disposed, and is configured in the form of a tube having the internal space. In an embodiment of the present disclosure, the housing body 210 is configured in the form of a tube whose front part is closed and rear part is open. The wire terminal contact part 110 is connected to the wire terminals 310 in the internal space of the housing body 210.

The terminal cover part 220 is integrally formed on the front part of the housing body 210, and a plurality of wire insertion holes 211 into which the wires 300 are inserted are provided on the rear part of the housing body 210. The wire insertion holes 211 extends toward the internal space of the housing body 210 to communicate with the internal space.

In addition, the front part of the housing body 210 is integrally formed on the front part of the wire terminal contact part 110, and is configured to surround the front surface of the wire terminal contact part 110. The contact pins 111 of the wire terminal contact part 110 are disposed in the internal space of the housing body 210.

The terminal cover part 220 is integrally formed on an outer side of the housing body 210, and is configured to surround the ground fixing part 120 of the earth terminal 100.

Specifically, the terminal cover part 220 is formed to extend outwardly from the front part of the housing body 210, and is disposed on the opposite sides of the wire insertion holes 211. The terminal cover part 220 is disposed on the outer side of the housing body 210, and is configured to surround a surface of the ground fixing part 120.

In this case, the terminal cover part 220 is configured to completely surround the ground fixing part 120 except for the central portion of the ground fixing part 120. That is, the terminal cover part 220 is configured to completely cover the ground fixing part 120 except for the earth bolting part 121 of the ground fixing part 120. Accordingly, the terminal cover part 220 is not formed in the earth bolting part 121. That is, the earth bolting part 121 is not covered by the terminal cover part 220.

To this end, the terminal cover part 220 has an upper opening hole 221 and a lower opening hole 222. The upper opening hole 221 is disposed on an upper side of the earth bolting part 121 to open an upper surface of the earth bolting part 121, and the lower opening hole 222 is disposed on a lower side of the earth bolting part 121 to open a lower surface of the earth bolting unit 121.

A lower surface of the terminal cover part 220 is formed to be parallel to the lower surface of the earth bolting part 121. Accordingly, when the lower surface of the earth bolting part 121 is in close contact with a vehicle body panel 400, the lower surface of the terminal cover part 220 is also in close contact with the vehicle body panel 400 (refer to FIG. 5). To this end, the terminal cover part 220 is molded to a predetermined thickness on the surface of the ground fixing part 120.

The connector housing 200 configured as described above is injection-molded using an insert molding method. In other words, the connector housing 200 is integrally molded on the surface of the earth terminal 100 by injecting a plastic resin into an injection mold while the earth terminal 100 is inserted into the injection mold for molding.

Referring to FIGS. 2 and 4, the housing body 210 of the connector housing 200 is molded into a tube shape in which the wire terminal contact part 110 of the earth terminal 100 is embedded, and the terminal cover part 220 of the connector housing 200 is formed on the surface of the ground fixing part 120 of the earth terminal 100.

Therefore, the electrical connector according to the present disclosure does not require a press-fitting process of press-fitting the wire terminal contact part 110 of the earth terminal 100 into the connector housing 200, and an exposed portion of the earth terminal 100 exposed to the outside of the connector housing 200 is minimized. In addition, the present disclosure has an advantage in that the productivity increases due to the deletion of the press-fitting process.

In addition, the present disclosure is advantageous for preventing corrosion of the earth terminal 100 by minimizing the exposure of the earth terminal 100 to the outside of the connector housing 200 and for preventing deterioration of aesthetics due to the corrosion of the earth terminal 100.

In addition, according to the present disclosure, since the connector housing 200 is integrally molded into the earth terminal 100, the amount of sealing material used for waterproofing and sealing portions of the electrical connector is reduced, thereby reducing cost.

As illustrated in FIGS. 3 and 5, the ground fixing part 120 is provided with a stopper part 123 that is hooked and assembled to the vehicle body panel 400. The stopper part 123 is provided on the edge of the ground fixing part 120 to be disposed opposite to the wire terminal contact part 110. The stopper part 123 is formed to extend in a curved shape on the edge of the ground fixing part 120. The vehicle body panel 400 is provided with a locking hole 410 to which the stopper part 123 is hooked and assembled.

The stopper part 123 is entirely covered by the terminal cover part 220. That is, the terminal cover part 220 is configured to cover the stopper part 123 together with the ground fixing part 120.

The stopper part 123 is assembled to the terminal cover part 220 provided on its surface so as to be in close contact with the locking hole 410 of the vehicle body panel 400. Accordingly, it is possible to prevent the stopper part 123 from flowing in a state of being assembled into the locking hole 410 of the vehicle body panel 400 or from being separated from the locking hole 410, and since the flow of the stopper part 123 is improved without using a separate part for preventing the flow and separation of the stopper part 123, it is possible to reduce the cost and improve the aesthetics.

Meanwhile, the terminal cover part 220 is formed on a plating layer 124 coated on the surface of the ground fixing part 120 as illustrated in FIG. 6. In other words, the terminal cover part 220 is formed on the surface of the ground fixing part 120 coated with the plating layer 124. The terminal cover part 220 is not formed on a plating layer 112 coated on the surface of the wire terminal contact part 110.

Here, the plating layer 112 formed on the surface of the wire terminal contact part 110 is referred to as a first plating layer 112, and the plating layer 124 formed on the surface of the ground fixing part 120 is referred to as a second plating layer 124.

The first plating layer 112 prevents corrosion of the wire terminal contact part 110, and the second plating layer 124 prevents corrosion of the ground fixing part 120.

In an embodiment of the present disclosure, the second plating layer 124 coated on the ground fixing part 120 has a different thickness from the first plating layer 112 coated on the wire terminal contact part 110. Specifically, the second plating layer 124 is formed to be thicker than the first plating layer 112. More specifically, the second plating layer 124 is formed to have a thickness corresponding to several times that of the first plating layer 112. For example, the thickness of the second plating layer 124 may be 3.0 μm, and the thickness of the first plating layer 112 may be 0.8 μm.

This is to ensure that the wire terminal contact part 110 maintains optimal connection performance, and at the same time, to prevent the corrosion of the ground fixing part 120 as much as possible. Since the ground fixing part 120 is mounted on the vehicle body panel 400 through the earth bolting part 121, it is vulnerable to corrosion. The thinner the thickness of the first plating layer 112, the more advantageous it is for the wire terminal contact part 110 to maintain optimal performance, and the thicker the second plating layer 124, the more advantageous it is to prevent the corrosion of the ground fixing part 120.

In an embodiment of the present disclosure, the first plating layer 112 and the second plating layer 124 may be formed of the same metal. For example, the first plating layer 112 and the second plating layer 124 may be formed of tin (Sn).

In addition, the second plating layer 124 is formed on the surface of the ground fixing part 120 to entirely have a uniform thickness, and extends to an inner circumferential surface of the earth bolting part 121.

As illustrated in FIGS. 3 and 6, the earth bolting part 121 is provided with a through hole 122 formed in the center of the radial direction, and the second plating layer 124 is also formed to have a predetermined thickness on the inner circumferential surface of the earth bolting part 121 surrounding the through hole 122. That is, the second plating layer 124 is formed to extend to the inner circumferential surface of the earth bolting part 121.

Meanwhile, as illustrated in FIG. 6, the terminal cover part 220 is provided with an upper sealing hole 223 and a lower sealing hole 224. The upper sealing hole 223 is disposed on an upper surface of the ground fixing part 120, and the lower sealing hole 224 is disposed on a lower surface of the ground fixing part 120. The upper sealing hole 223 and the lower sealing hole 224 are disposed at a predetermined distance from the earth bolting part 121 in the radial direction of the earth bolting part 121.

The upper sealing hole 223 and the lower sealing hole 224 are formed in a closed loop shape surrounding the earth bolting part 121. For example, the upper sealing hole 223 and the lower sealing hole 224 may be formed in a ring shape extending along the circumference of the earth bolting part 121, and be disposed to be concentric with the earth bolting part 121.

An upper sealing part 225 and a lower sealing part 226 for preventing moisture from entering between the terminal cover part 220 and the ground fixing part 120 are inserted into the upper sealing hole 223 and the lower sealing hole 224. The upper sealing part 225 is formed of a sealing material applied and filled in the upper sealing hole 223, and the lower sealing part 226 is formed of a sealing material applied and filled in the lower sealing hole 224.

The upper sealing part 225 and the lower sealing part 226 are disposed on a radially outer side the earth bolting part 121 to seal the circumference of the earth bolting part 121. Accordingly, even though a minute gap occurs between the terminal cover part 220 and the ground fixing part 120, the upper sealing part 225 and the lower sealing part 226 prevent moisture from entering through the gap.

The upper sealing part 225 is formed of a sealing material applied to the upper surface of the ground fixing part 120 through the upper sealing hole 223, and is bonded to the upper surface of the ground fixing part 120 in a state of hermetically close contact while the sealing material is hardened. That is, the upper sealing part 225 is hermetically bonded to the upper surface of the ground fixing part 120.

The lower sealing part 226 is formed of a sealing material applied to the lower surface of the ground fixing part 120 through the lower sealing hole 224, and is bonded to the lower surface of the ground fixing part 120 in a state of hermetically close contact while the sealing material is hardened. That is, the lower sealing part 226 is hermetically bonded to the lower surface of the ground fixing part 120. As the sealing material, silicone, which is hardened at room temperature, or the like may be used.

In an embodiment of the present disclosure, the upper sealing part 225 and the lower sealing part 226 are formed in the upper sealing hole 223 and the lower sealing hole 224, respectively, through an application-type sealing process, that is, a potting process.

The upper sealing part 225 may be formed in the same shape as the upper sealing hole 223, and the lower sealing part 226 may be formed in the same shape as the lower sealing hole 224.

More specifically, the upper sealing part 225 is spaced apart from the earth bolting part 121 with respect to the radial direction of the earth bolting part 121, and is formed in a closed loop shape surrounding the earth bolting part 121. The lower sealing part 226 is also spaced apart from the earth bolting part 121 with respect to the radial direction of the earth bolting part 121, and is formed in the closed loop shape surrounding the earth bolting part 121.

For example, the upper sealing part 225 and the lower sealing part 226 may be formed in a ring shape extending along the circumference of the earth bolting part 121, and be disposed to be concentric with the earth bolting part 121.

In the present disclosure, as the sealing process for realizing a waterproof function of the electrical connector is applied to the outer side of the earth bolting part 121, the amount of sealing material used is reduced compared to the prior art, so it is possible to reduce the cost, and as a sealing range for realizing the waterproof function is reduced compared to the prior art, waterproof performance is improved.

Meanwhile, referring to FIGS. 1 and 2, a cap mounting hole 212 communicating with the internal space of the housing body 210 is provided on a side surface of the housing body 210, and a side cap 213 is assembled to the cap mounting hole 212.

The electrical connector according to the present disclosure may check an alignment position of the wire terminal contact part 110 located in the internal space of the housing body 210 through the cap mounting hole 212.

The electrical connector according to the present disclosure configured and operated as described above may obtain the following effects.

First, it is possible to minimize an exposed portion of an earth terminal exposed to the outside of a connector housing by integrally molding the connector housing to the earth terminal, thereby preventing corrosion of the earth terminal and increasing waterproof performance.

Second, since the connector housing is integrally molded to the earth terminal, a press-fitting process of press-fitting a wire terminal contact part of the earth terminal into the connector housing is unnecessary, and connector productivity increases because the press-fitting process is omitted.

Third, since the connector housing is integrally formed to the earth terminal, the amount of sealing material used for waterproofing and a sealing part of the electrical connector is reduced, thereby reducing the cost. In addition, the waterproof performance is improved as a sealing range for realizing a waterproof function is reduced compared to the prior art.

Fourth, since the wire terminal contact part and a ground fixing part of the earth terminal are plated with different thicknesses, the wire terminal contact part maintains optimum connection performance, and at the same time, it is possible to prevent corrosion of the ground fixing part as much as possible.

Fifth, since a stopper part of the earth terminal is also provided with a terminal cover part, it is possible to prevent the stopper part from flowing in a state of being assembled to a vehicle grounding part or from being separated from the vehicle grounding part. Since the flow of the stopper part is improved without using a separate part for preventing the flow and separation of the stopper part, it is possible to reduce a cost and improve aesthetics. The embodiments of the present disclosure have been described above in detail, and the terms or words used in the present specification and the claims should not be construed as being limited to conventional or dictionary meanings, and in addition, the scope of the present disclosure is not limited to the above-described embodiments and various modifications and improvements by those skilled in the art using the basic concept of the present disclosure defined in the appended claims are also included in the scope of the present disclosure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electrical connector comprising:

an earth terminal including a wire terminal contact part and a ground fixing part integrated with the wire terminal contact part; and a connector housing including a housing body in which the wire terminal contact part is placeable and a terminal cover part located outside of the housing body and configured to surround the ground fixing part, wherein the ground fixing part comprises an earth bolting part in a center of the ground fixing part, the earth bolting part configured for fastening to a vehicle grounding part, wherein the terminal cover part is configured to surround the ground fixing part except for the earth bolting part, and wherein the connector housing comprises an upper sealing part configured to:

prevent moisture from entering between the terminal cover part and the ground fixing part; and be provided on a radially outer side of the earth bolting part.

2. The electrical connector of claim 1, wherein the connector housing comprises a lower sealing part configured to:

prevent the moisture from entering between the terminal cover part and the ground fixing part; and be provided on the radially outer side of the earth bolting part.

3. The electrical connector of claim 2, wherein the upper sealing part comprises a closed loop shape surrounding the earth bolting part on an upper surface of the ground fixing part, and wherein the lower sealing part comprises the closed loop shape surrounding the earth bolting part on a lower surface of the ground fixing part.

4. The electrical connector of claim 2, wherein the terminal cover part comprises an upper sealing hole into which the upper sealing part is insertable and a lower sealing hole into which the lower sealing part is insertable, and wherein the upper sealing hole and the lower sealing hole are spaced radially from the earth bolting part.

5. The electrical connector of claim 4, wherein each of the upper sealing hole and the lower sealing hole is concentric with respect to the earth bolting part.

6. The electrical connector of claim 5, wherein the upper sealing part is hermetically bonded to an upper surface of the ground fixing part and the lower sealing part is hermetically bonded to a lower surface of the ground fixing part.

7. The electrical connector of claim 6, wherein the lower sealing part and the upper sealing part comprise hardened silicone.

8. The electrical connector of claim 1, wherein the earth terminal further comprises:

a first plating layer located on a surface of the wire terminal contact part, a second plating layer located on a surface of the ground fixing part, and wherein the second plating layer is thicker than the first plating layer.

9. The electrical connector of claim 8, wherein the terminal cover part is arrangeable on the second plating layer.

10. The electrical connector of claim 8, wherein the earth bolting part comprises a through hole in a center of the earth bolting part, and wherein the second plating layer is arranged to extend to an inner circumferential surface of the earth bolting part surrounding the through hole.

11. The electrical connector of claim 1, wherein the ground fixing part comprises a stopper part extending in a curved shape on an edge thereof, and wherein the terminal cover part is configured to surround the stopper part together with the ground fixing part.

12. The electrical connector of claim 1, wherein the terminal cover part is disposed on an outer side of the housing body.

13. The electrical connector of claim 1, wherein the wire terminal contact part comprises a first number of pins arranged in a first plane and a second number of pins arranged in a second plane, the first plane spaced apart from the second plane.

14. The electrical connector of claim 13, wherein the ground fixing part is connected to the wire terminal contact part in step like fashion so that the ground fixing part is arranged below the first plane and the second plane is arranged above the first plane.

15. The electrical connector of claim 14, wherein the ground fixing part comprises a stopper part extending in a direction opposite to the first and second planes, and wherein the stopper part is arranged at an opposite end of the earth terminal in a longitudinal direction from the pins.

16. The electrical connector of claim 13, wherein the first number of pins is connected to the second number of pins via a single side connection arranged at a side parallel to a longitudinal direction of the earth terminal.

17. The electrical connector of claim 13, wherein the first number of pins is different than the second number of pins.

18. The electrical connector of claim 17, wherein the first number of pins comprises at least 4 pins and the second number of pins comprises at least 6 pins.

19. The electrical connector of claim 13, wherein the housing body comprises wire terminals corresponding to the pins, the wire terminals configured to contact a plurality of individual devices.

* * * * *